United States Patent [19]
Morita et al.

[11] 3,928,208
[45] Dec. 23, 1975

[54] CORE BODY FOR USE IN COIL TYPE BLOOD DIALYZER

[75] Inventors: Shiro Morita; Konosuke Fujiki, both of Tokyo; Kazuo Takeda, Yokohama, all of Japan

[73] Assignee: Mitsubishi Chemical Industries Ltd., Tokyo, Japan

[22] Filed: Aug. 14, 1974

[21] Appl. No.: 497,390

[30] Foreign Application Priority Data
Aug. 14, 1973 Japan.................................. 48-91055

[52] U.S. Cl................................. 210/321; 210/494
[51] Int. Cl.².................... B01D 31/00; B01D 13/00
[58] Field of Search............. 210/22, 321, 494, 541, 210/542

[56] References Cited
UNITED STATES PATENTS

| | | | |
|---|---|---|---|
| 3,357,565 | 12/1967 | Burger | 210/494 X |
| 3,489,647 | 1/1970 | Kolobuw | 210/22 X |
| 3,698,560 | 10/1972 | Tapp et al | 210/321 |

Primary Examiner—Frank A. Spear, Jr.
Attorney, Agent, or Firm—Oblon, Fisher, Spivak, McCelland & Maier

[57] ABSTRACT

A tubular core body for use in a coil type blood dialyzer, in which a dialyzing tubular membrane and a membrane supporting member are coiled around the core body, characterized in that a circumferential groove is formed in the outer peripheral surface of the core body, leaving flangelike edge portions at the ends thereof, and the axial length of the groove is smaller than that of the supporting member, with the radial depth of the groove being at least equal to that of the membrane.

4 Claims, 5 Drawing Figure

CORE BODY FOR USE IN COIL TYPE BLOOD DIALYZER

BACKGROUND OF THE INVENTION

1. Field of the Invention:

This invention relates generally to a component of a blood dialyzer, such as an artificial kidney unit, and more particularly to an improved core body for use in a coil type blood dialyzer.

2. Description of the Prior Art:

In a blood dialyzer, the unwanted high flow resistance experienced with a blood circuit lowers not only the efficiency but also the safety of the dialyzing operation, in the case where the end of the blood circuit is directly connected to the body of a patient, as in the case with the artificial kidney unit. To overcome such shortcomings, there have been proposed many devices which have only met with partial success and thus fail to provide completely satisfactory blood dialyzers.

Coil type blood dialyzers, in general, comprise a dialyzing tubular membrane and a supporting member for the membrane, both of which are wrapped or coiled around a core body. In this respect, the starting portion of the coiled tubular membrane, when coiled around the core body, leaves no room for relieving the pressure loss, because the membrane or supporting member is in tight contact with the core body, such that high flow resistance inherently results in such blood circuits.

SUMMARY OF THE INVENTION

Accordingly, it is an object of the present invention to provide an improved blood dialyzer having low resistance to blood flow.

Another object of the present invention is to provide an improved core body for use in a blood dialyzer which will not cause high resistance to flow of blood in the dialyzer.

The foregoing and other objects of this invention are attained through the provision of a core body of a cylindrical or tubular configuration, in which at least part of the outer peripheral surface thereof, except the end portions thereof, is cut away to form an axially elongated circumferential groove having an axial or longitudinal length which is smaller than that of the membrane supporting member.

BRIEF DESCRIPTION OF THE DRAWINGS

Various other objects, features and attendant advantages of the present invention will be more fully appreciated as the same becomes better understood from the following detailed description when considered in connection with the accompanying drawings, in which like reference numerals designate like or corresponding parts throughout the several views, and wherein.

Figure 1:
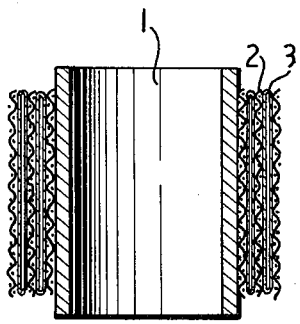
FIG. 1 is a longitudinal cross-sectional view of one example of a combination of a conventional type tubular core body, a supporting member and a dialyzing tubular membrane.

DETAILED DESCRIPTION OF THE PREFERRED EMBODIMENTS:

Referring now to the drawings, and more particularly to FIG. 1, there is shown a conventional arrangement of a vertically oriented tubular core body 1, a supporting member 2 for a dialyzing tubular membrane, and a dialyzing tubular membrane 3. In this respect, the supporting member 2 as well as the dialyzing tubular membrane 3 are coiled on themselves, but around the core body in sandwiched relation to each other. The construction of the supporting member 2 is such as to allow the free passage of liquid, for example, being of a net or mesh construction. Thus, a dialyzing liquid is introduced into a space which is defined between the adjoining two dialyzing tubular membranes and includes the aforesaid supporting member therein, for the purpose of effecting dialysis for the blood which flows through the tubular membrane. With such a completely cylindrical or tubular core body, in the case where the blood is caused to flow from the inner run of the tubular membrane to the outer run thereof, there will be caused a considerably high level of pressure loss, which is inherent to such a dialyzer, because such an inner run of the tubular membrane leaves no room for relieving the pressure loss thus created, in terms of an inward direction of the core body.

Figure 2:
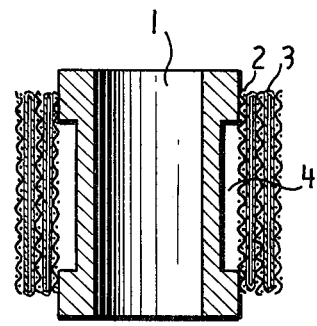
FIG. 2 is a longitudinal cross-sectional view of similar elements forming the combination illustrated in FIG. 1, but including one embodiment of a core body according to the present invention.
Figure 3:
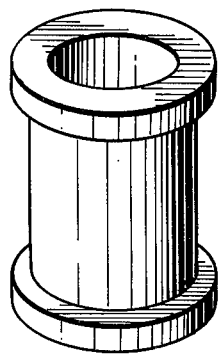
FIG. 3 is a perspective view of the core body of FIG. 2.

As shown in FIG. 2, however, one embodiment of a core body 1 of the present invention is illustrated, and a supporting member 2 and a dialyzing tubular membrane 3 are also shown in the same manner as in FIG. 1, respectively. In this case, however, the outer peripheral surface of the core body 1 is cut-away as shown at 4, to provide a circular channel or groove of relatively large axial or longitudinal length, encompassed by flanges at each axial end of the core body. Essentially, therefore, a core body of a spool-like configuration is formed.

With such a core body as given in the present invention, unlike the conventional core body shown in FIG. 1, the pressure of the blood exerted on the tubular membrane 3 and the supporting member 2, when flowing into the dialyzer, may find a way in an inward direction of the core body, thus resulting in a desired reduction of the pressure loss. It follows that a blood circuit having lesser pressure loss may be achieved throughout the entire run of the circuit.

According to the present invention, the width and depth of the cut-away portion 4 in the outer peripheral surface of the core body should be such that, as has been already described, a majority of the pressure being exerted on the supporting member 2 and the tubular membrane 3 may be relieved inwardly of the core body 1. In this instance, the terms "width" and "depth," as used herein, are the vertical extent or distance and the horizontal extent or distance of the cut-away portion 4, as viewed in FIG. 2. That is, the "width" is the axial or longitudinal measurement of the cut-away portion, or the groove, relative to the tubular body, and the "depth" is the radial extent or penetration of the groove from the peripheral surface of the tubular core body. Thus, many modifications of such a cut-away portion or groove may be inferred under these conditions. However, it is a prerequisite that the supporting member at least be in contact with the upper and lower ends, or flange-like edge portions of the outer peripheral surface of the core body, whereby the supporting member may be supported by the core body. For this reason, the width of the cutaway portion or groove, should be smaller than that of the supporting member. Furthermore, the width of the cut-away portion should be so designed as to be equal to or larger than that of the dialyzing tubular membrane. The radial depth of the groove should be at least equal to that of the membrane. More preferably, it should be larger than the diameter of strand of the membrane supporting member. By this, means may be provided for relieving the pressure loss over the range covering the substantially entire width of the aforesaid tubular membrane.

Figure 4:
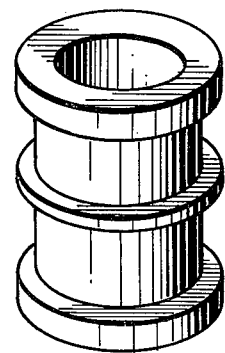
FIGS. 4 and 5 are perspective views of other modifications of the core body formed according to the present invention.
Figure 5:
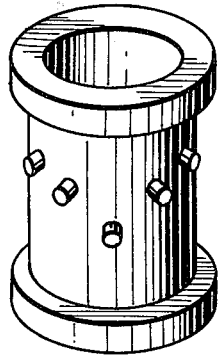

Meanwhile, as shown in the embodiments illustrated in FIGS. 4 and 5, the median portion of the outer peripheral surface of the core body may be only partially cut-away to thereby respectively leave an annular projecting portion or wart-like formations remaining thereon for the purpose of presenting supporting portions for the supporting member or the tubular membrane and achieving the aforementioned advantages, that is, specifically of reducing the pressure loss in the blood circuit.

As is clear from the foregoing description, the core body according to the present invention may minimize the pressure loss in the blood circuit, and thus may present an excellent dialyzer of the coil type which presents improved efficiency for the dialyzing operation, with high safety.

Obviously, many modifications and variations of the present invention are possible in light of these teachings. It is to be understood therefore that within the scope of the appended claims, the invention may be practiced otherwise than as specifically described herein.

We claim:

1. In a coil type blood dialyzer characterized by a core body having a membrane supporting member and a dialyzing tubular membrane coiled thereabout in sandwiched relation to each other, the improvement comprising:

said core body being of tubular configuration and having a circumferential channel of substantial axial length formed in the outer periphery thereof, thereby forming a spool-like structure having a radially outwardly extending flange at each end, and wherein the axial length of said channel is smaller than that of the supporting member, such that the supporting member is supported on said flanges in spaced relation from the base of said channel.

2. In a coil type blood dialyzer as set forth in claim 1, the radial depth of said channel from the outer periphery of said flanges of said tubular core body to the base of said channel being at least equal to the thickness of the dialyzing tubular membrane.

3. In a coil type blood dialyzer as set forth in claim 1, said core body further having at least one annular radially outwardly projecting portion being formed within said channel substantially intermediate said flanges thereof, said portion projecting no further outward than the outer periphery of said flanges of said core body.

4. In a coil type blood dialyzer as set forth in claim 1, said core body having at least one wartlike outwardly extending formation being formed within said channel, said formation projecting no further outward than the periphery of said flanges of said core body.

* * * * *